United States Patent
Inami

(10) Patent No.: US 10,244,125 B2
(45) Date of Patent: Mar. 26, 2019

(54) IMAGE FORMING APPARATUS TO GENERATE A CALIBRATION CHART INCLUDING A PLURALITY OF PATCHES AT DIFFERENT DENSITIES, METHOD, AND NON-TRANSITORY RECORDING MEDIUM STORING PROGRAM

(71) Applicant: Yuu Inami, Tokyo (JP)

(72) Inventor: Yuu Inami, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/662,424

(22) Filed: Jul. 28, 2017

(65) Prior Publication Data

US 2018/0041646 A1   Feb. 8, 2018

(30) Foreign Application Priority Data

Aug. 4, 2016 (JP) ................................ 2016-153718

(51) Int. Cl.
*G06K 15/02* (2006.01)
*H04N 1/00* (2006.01)

(52) U.S. Cl.
CPC ....... *H04N 1/00045* (2013.01); *G06K 15/027* (2013.01); *H04N 1/00023* (2013.01); *H04N 1/00087* (2013.01); *H04N 1/00702* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 2010/0021188 A1* | 1/2010 | Mizumukai | G03G 15/161 399/31 |
| 2011/0063697 A1 | 3/2011 | Shibuya | |
| 2013/0021620 A1* | 1/2013 | Doi | G06K 15/027 358/1.2 |
| 2014/0218434 A1* | 8/2014 | Kosuge | B41J 2/21 347/17 |
| 2017/0041510 A1* | 2/2017 | Sakatani | H04N 1/32106 |

FOREIGN PATENT DOCUMENTS

| | | |
|---|---|---|
| JP | 2011-087285 | 4/2011 |
| JP | 2013-012828 | 1/2013 |

* cited by examiner

*Primary Examiner* — Scott A Rogers
(74) *Attorney, Agent, or Firm* — Harness, Dickey & Pierce, P.L.C.

(57) ABSTRACT

An image forming apparatus generates a calibration chart including a plurality of patches at different densities. The image forming apparatus includes at least one sensor, a memory, and a circuitry. The memory stores patch data values of the patches. The circuitry acquires sheet data about a sheet to which the calibration chart is output. The circuitry generates the calibration chart in which the patches are arranged in a color measurable region of the at least one sensor, based on at least the sheet data and data indicating the color measurable region.

19 Claims, 12 Drawing Sheets

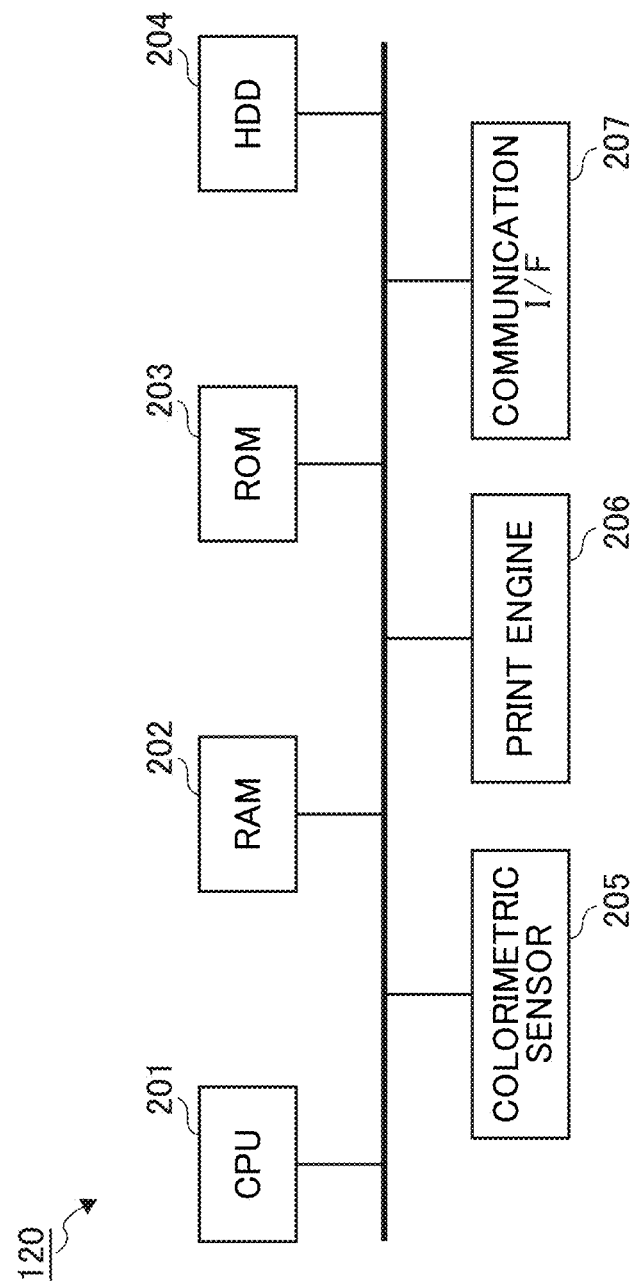

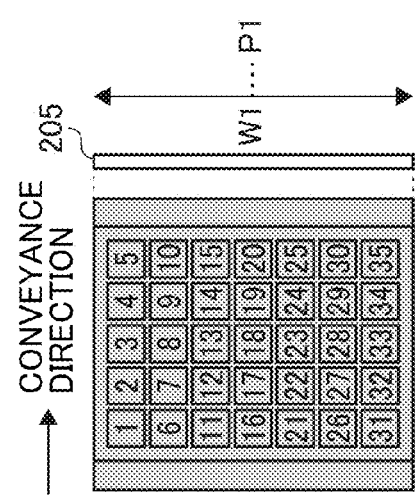
FIG. 7A-1
FIG. 7A-2
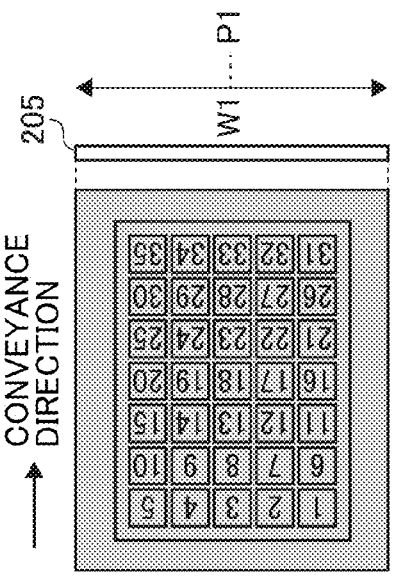
FIG. 7B-1
FIG. 7B-2

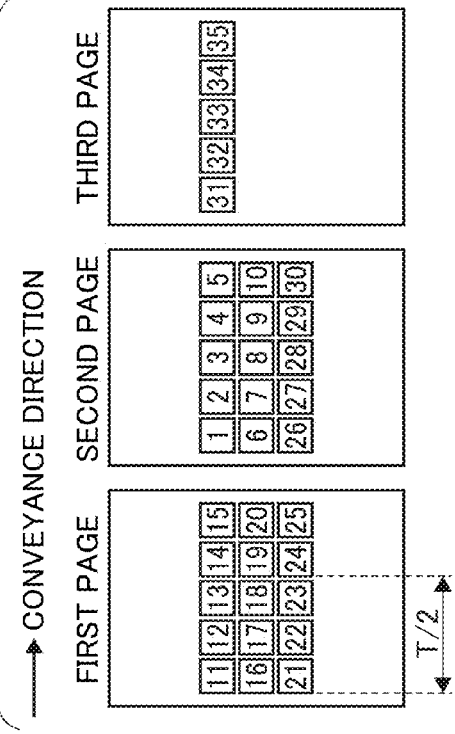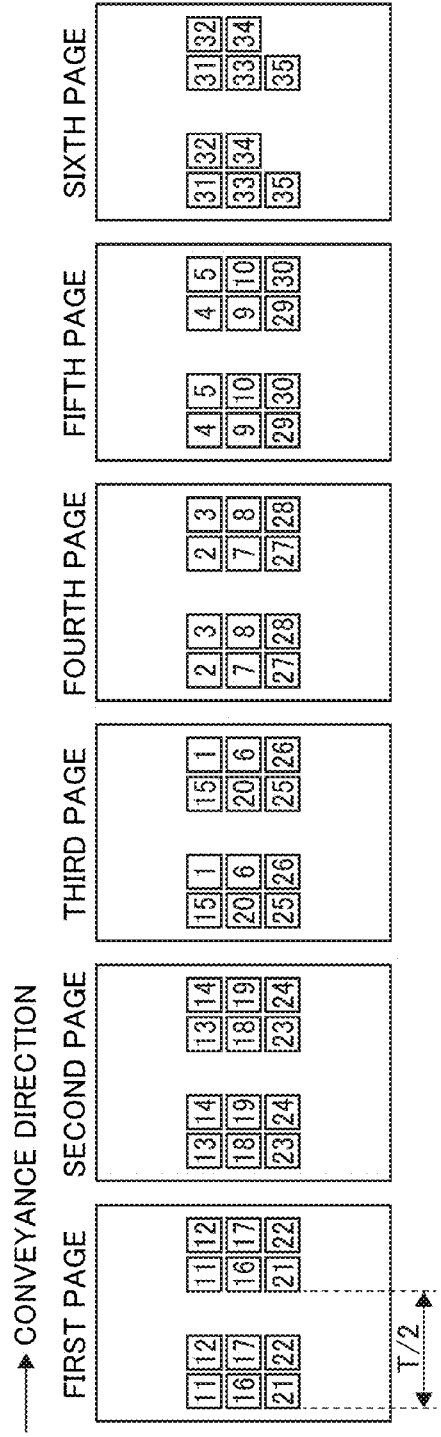

IMAGE FORMING APPARATUS TO GENERATE A CALIBRATION CHART INCLUDING A PLURALITY OF PATCHES AT DIFFERENT DENSITIES, METHOD, AND NON-TRANSITORY RECORDING MEDIUM STORING PROGRAM

CROSS-REFERENCE TO RELATED APPLICATION

This patent application is based on and claims priority pursuant to 35 U.S.C. § 119(a) to Japanese Patent Application No. 2016-153718, filed on Aug. 4, 2016, in the Japan Patent Office, the entire disclosure of which is hereby incorporated by reference herein.

BACKGROUND

Technical Field

Aspects of the present disclosure relate to an image forming apparatus, a method of generating a calibration chart, and a non-transitory recording medium storing a computer executable program to cause the image forming apparatus to perform the method.

Related Art

There has been known a technology which outputs a color chart for calibration, and compares measured colors in the chart with target values to obtain correction values for improvement of color reproducibility of images output from an image forming apparatus. For example, there has been proposed a mixed color calibration technology which focuses attention on destination profile included in International Color Consortium (ICC) profile, and modifies this destination profile to correct color differences in mixed colors.

An automatic calibration technology proposed in recent years for electrophotographic image output devices includes a sensor for detecting colors and densities. This sensor is provided on a sheet conveyance unit disposed on the downstream of a fixing process, and reads an output chart to perform calibration.

SUMMARY

In an aspect of the present disclosure, there is provided an image forming apparatus to generate a calibration chart including a plurality of patches at different densities. The image forming apparatus includes at least one sensor, a memory, and a circuitry. The memory stores patch data values of the patches. The circuitry acquires sheet data about a sheet to which the calibration chart is output. The circuitry generates the calibration chart in which the patches are arranged in a color measurable region of the at least one sensor, based on at least the sheet data and data indicating the color measurable region.

In another aspect of the present disclosure, there is provided a method of generating a calibration chart including a plurality of patches at different densities. The method includes acquiring sheet data about a sheet to which the calibration chart is output, and generating the calibration chart in which the patches are arranged in a color measurable region of at least one sensor of a device to output the calibration chart, based on at least the sheet data and data indicating the color measurable region.

In still another aspect of the present disclosure, there is provided a non-transitory recording medium that stores a computer executable program to cause an image forming apparatus to perform a method of generating a calibration chart including a plurality of patches at different densities. The method includes storing patch data values of the patches, acquiring sheet data about a sheet to which the calibration chart is output, and generating the calibration chart in which the patches are arranged in a color measurable region of at least one sensor of the image forming apparatus, based on at least the sheet data and data indicating the color measurable region.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 7A-1 through 7B-2 are views illustrating examples for generating a calibration chart based on a position of a colorimetric sensor in the image forming apparatus;

FIGS. 8A-I through 8B-2 are views illustrating examples for generating a calibration chart based on positions of colorimetric sensors in the image forming apparatus;

FIGS. 9A-I through 9B-2 are views illustrating examples for generating a calibration chart based on a position of a colorimetric sensor in the image forming apparatus;

FIGS. 10A and 10B are views illustrating an example of a calibration chart generated when color fluctuations are produced in the image forming apparatus;

Figure 1:
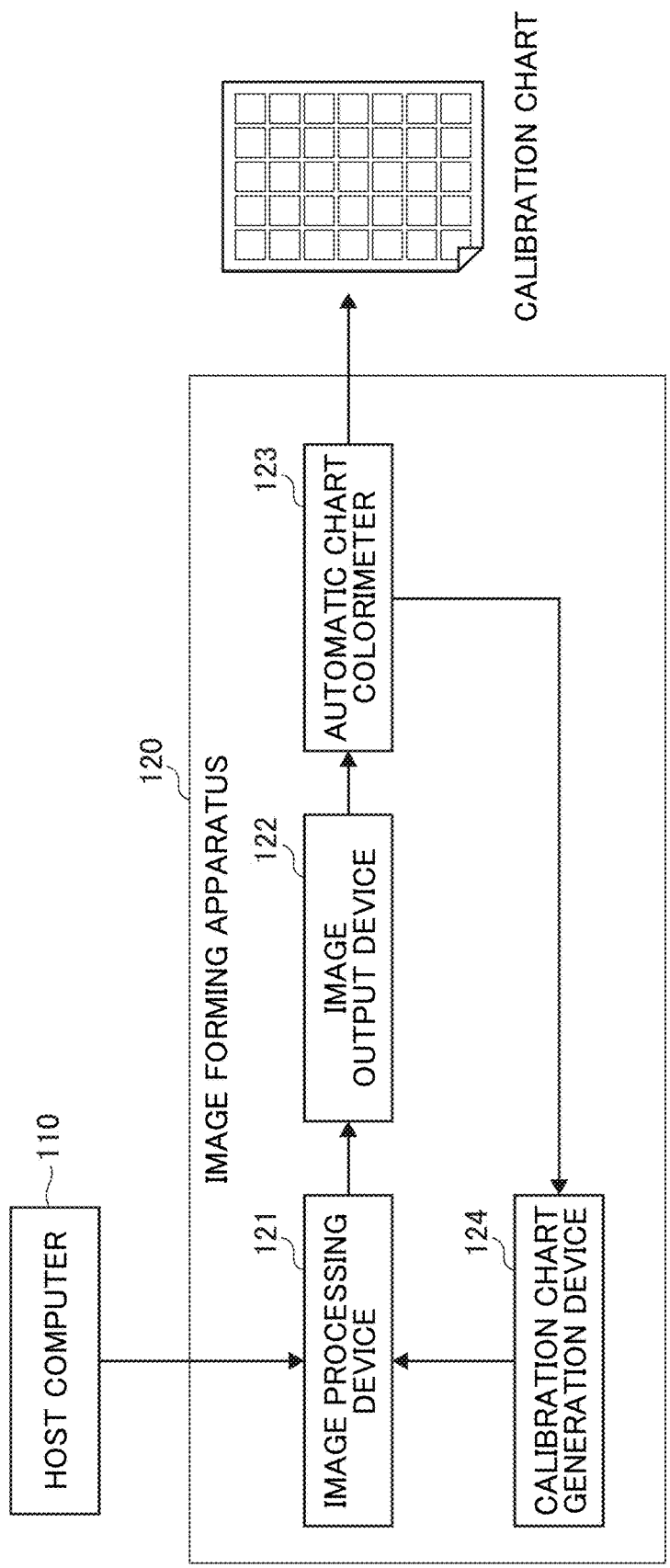
FIG. 1 is a diagram illustrating a general configuration of a print system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Example embodiments of the present disclosure are hereinafter described. However, embodiments of the present disclosure are not limited to the embodiments described below. Similar elements illustrated in respective figures referred to herein are given similar reference numbers. The same description for the same elements is not repeated where appropriate.

FIG. 1 is a diagram illustrating a general configuration of a print system according to an embodiment of the present disclosure. The print system includes a host computer 110 and an image forming apparatus 120. The image forming apparatus 120 includes an image processing device 121, an image output device 122, an automatic chart colorimeter 123, and a calibration chart generation device 124.

The host computer 110 having received a print job from various types of applications starts a printer driver to transmit print data to the image processing device 121. Accordingly, the host computer 110 functions as a terminal for transmitting print data.

The image processing device 121 performs various types of image processing for print data, and for image data such as a calibration chart (hereinafter referred to as "chart") to convert these data into printer output data. Thereafter, the image output device 122 fixes the printer output data to a print sheet to form an image indicating the printer output data on the sheet.

When a printed material is a chart, the automatic chart colorimeter 123 reads the chart, and feeds back a reading result to the calibration chart generation device 124. The image forming apparatus 120 is therefore capable of correcting color reproducibility based on the reading result.

A specific hardware configuration of the image forming apparatus 120 is hereinafter described. FIG. 2 is a diagram illustrating a hardware configuration of the image forming apparatus 120 according to an embodiment of the present disclosure.

The image forming apparatus 120 includes a central processing unit (CPU) 201, a random access memory (RAM) 202, a read only memory (ROM) 203, a hard disk drive (HDD) 204, a colorimetric sensor 205, a print engine 206, and a communication interface (I/F) 207. Respective elements included in the hardware are hereinafter described.

The CPU 201 is a device which executes programs for controlling operations of the image forming apparatus 120. The RAM 202 is a volatile storage device which provides a work space for the CPU 201 at the time of execution of the respective programs. The ROM 203 is a non-volatile storage device which stores programs and the like executed by the CPU 201. The HDD 204 is a storage device which stores programs, setting items and the like associated with the functions performed by the image forming apparatus 120.

The colorimetric sensor 205 is a colorimeter which reads charts, such as a contact image sensor (CIS). The image forming apparatus 120 corrects gamma values based on a reading result obtained by the colorimetric sensor 205 to correct color reproducibility.

The print engine 206 is a device which forms image data on a sheet or the like, and includes a conveyance device for conveying a sheet, a fixing device for fixing image data to a sheet, and others. The communication I/F 207 is an interface provided between the image forming apparatus 120 and the host computer 110 for data transmission and reception in a wired or wireless manner, for example.

Figure 3:
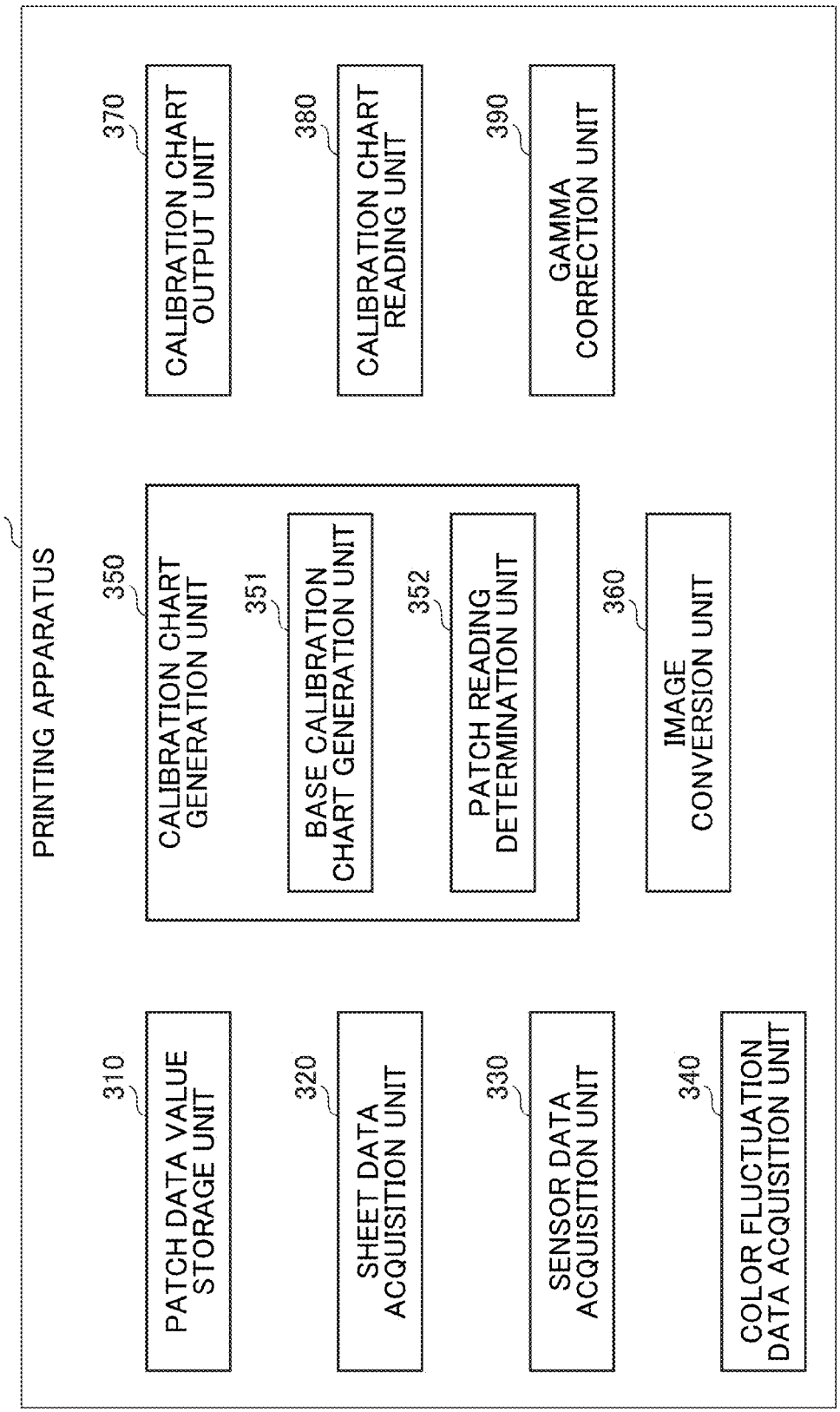
FIG. 3 is a software block diagram of the image forming apparatus.

The hardware included in the image forming apparatus 120 is configured as described above. Hereinafter described with reference to FIG. 3 are functional units executed by the respective elements of the hardware of the image forming apparatus 120 according to the present embodiment. FIG. 3 is a software block diagram of the image forming apparatus 120 according to an embodiment of the present disclosure.

The image forming apparatus 120 includes a patch data value storage unit 310, a sheet data acquisition unit 320, a sensor data acquisition unit 330, a color fluctuation data acquisition unit 340, a calibration chart generation unit 350, an image conversion unit 360, a calibration chart output unit 370, a calibration chart reading unit 380, and a gamma correction unit 390. The respective functional units are hereinafter described.

The patch data value storage unit 310 is a unit for storing patch data values of color patches included in a chart. The patch data values include RGB values, such as digital values of colorant signals, and halftone dot area ratios, for example.

The sheet data acquisition unit 320 is a unit for acquiring a sheet size and a conveyance direction of a sheet on which a chart is printed. There are two direction types for conveying a sheet: long edge feed (LEF); and short edge feed (SEE). A long direction of a sheet is defined as a main scanning direction for LEF, while a short direction of a sheet is defined as a main scanning direction for SEE.

The sensor data acquisition unit 330 is a unit for acquiring data from the colorimetric sensor 205 included in the image forming apparatus 120. The data acquired from the colorimetric sensor 205 in this context refers to data indicating the number of sensors, a color measurable width, a sensor center coordinate position, and a reading start position and a reading end position in the main scanning direction, for example. The data from colorimetric sensor 205 may be acquired by accessing the colorimetric sensor 205 for data acquisition, or by reading data from various storages retaining the data beforehand.

The color fluctuation data acquisition unit 340 is a unit for acquiring data which indicates color density fluctuations produced for configurational reasons of the image output device 122. The color density fluctuations are cyclic density fluctuations produced in a sub-scanning direction of a printed material, and cause calibration errors in some cases. Accordingly, the color fluctuation data acquisition unit 340 acquires color fluctuation data to increase calibration accuracy.

The calibration chart generation unit 350 is a unit for generating a chart based on various items of acquired data. The calibration chart generation unit 350 includes a base calibration chart generation unit 351, and a patch reading determination unit 352. The base calibration chart generation unit 351 is a unit for generating a base calibration chart in which color patches are arranged in a printable region of a print sheet (hereinafter referred to as base chart). The patch reading determination unit 352 is a unit for determining whether the respective patches on the base chart are readable by the colorimetric sensor 205. The calibration chart generation unit 350 generates, based on a base chart, a result determined by the patch reading determination unit 352, a chart which includes color patches at positions readable by the colorimetric sensor 205.

The image conversion unit 360 is a unit for converting a chart generated by the calibration chart generation unit 350 into an image format for output by the image output device 122. The image conversion unit 360 is capable of converting and outputting image data contained in a print job.

The calibration chart output unit 370 is a unit for printing an image of a chart on a sheet, and outputting the printed image. Printing of a chart is executed by the print engine 206.

The calibration chart reading unit 380 is a unit for reading color patches contained in a chart output from the calibration chart output unit 370. Color patches are read by the colorimetric sensor 205 to acquire data indicating colors, densities and the like of the respective color patches.

The gamma correction unit 390 is a unit for performing gamma correction based on data about color patches read by the calibration chart reading unit 380. Gamma correction is performed by comparing values stored in the patch data value storage unit 310 and reading values of color patches, and correcting differences between the values of the patch data value storage unit 310 and the values of the color patches.

The software blocks presented in the above-described embodiment correspond to functional units realized by the functions of the respective elements of the hardware under the program of the present embodiment executed by the CPU 201. All of the functional units presented in the above-described embodiment may be realized by software, or a part or all of the functional units may be implemented by hardware providing equivalent functions.

Figure 4:
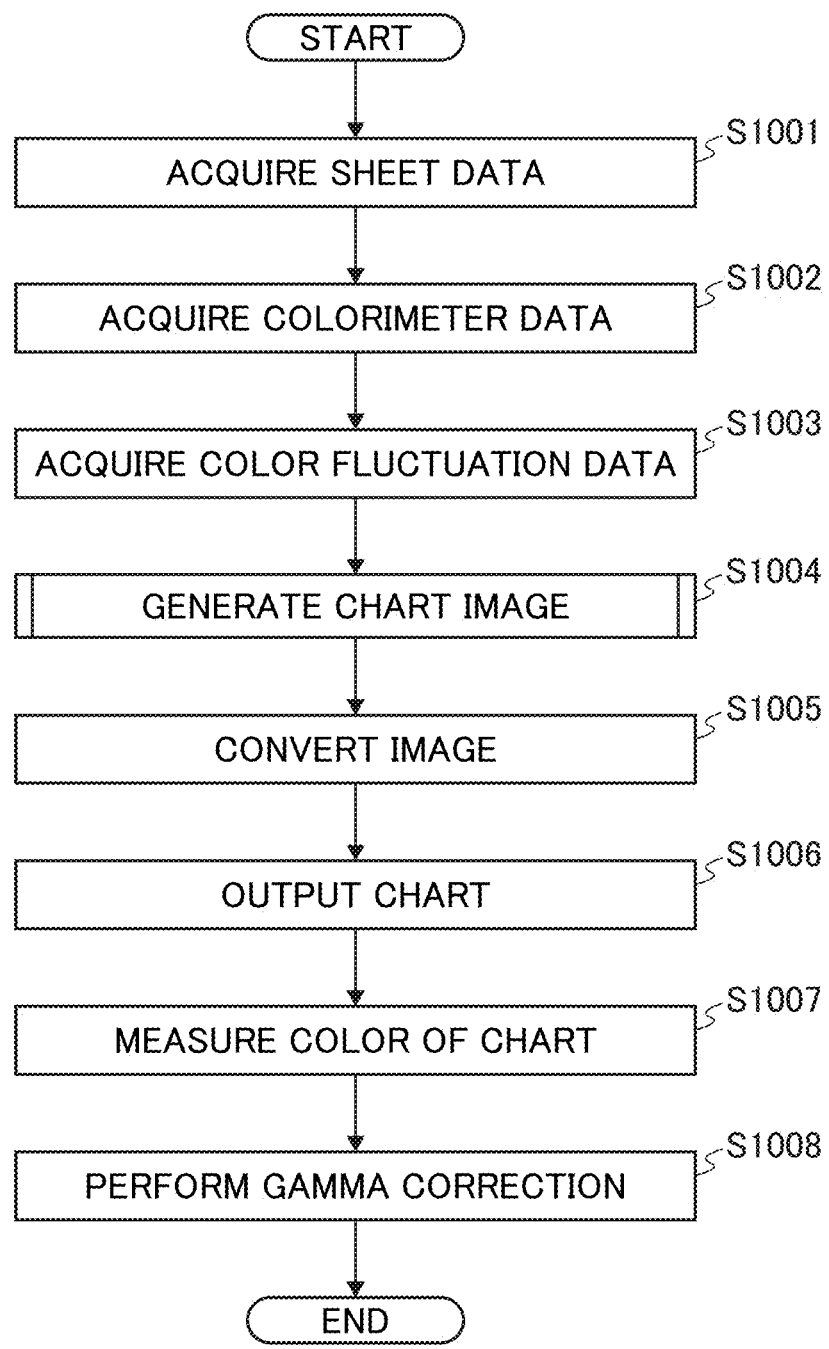
FIG. 4 is a flowchart illustrating a process of calibration executed by the image forming apparatus.

The image forming apparatus 120 according to an embodiment of the present disclosure is configured as described above. A more specific example of an embodiment of the present disclosure is hereinafter described with reference to flowcharts. FIG. 4 is a flowchart illustrating a calibration process executed by the image forming apparatus 120 according to the present embodiment.

When the image forming apparatus 120 starts the process illustrated in FIG. 4, sheet data, colorimetric sensor data (colorimeter data), and color fluctuation data are acquired in steps S1001, S1002, and S1003. Note that the order of steps S1001 through S1003 is not particularly limited.

In subsequent step S1004, a chart image is generated based on respective items of the acquired data. A method for generating the chart will be detailed below.

In step S1005, data indicating the generated chart image is converted into a format for output from the image output device 122. In subsequent step S1006, the chart image is fixed to a sheet, and output as the sheet. Subsequently the colorimetric sensor 205 measures colors on the chart in step S1007. Gamma correction is performed based on a result of color measurement in step S1008. Then, the image forming apparatus 120 ends the process.

Figure 5:
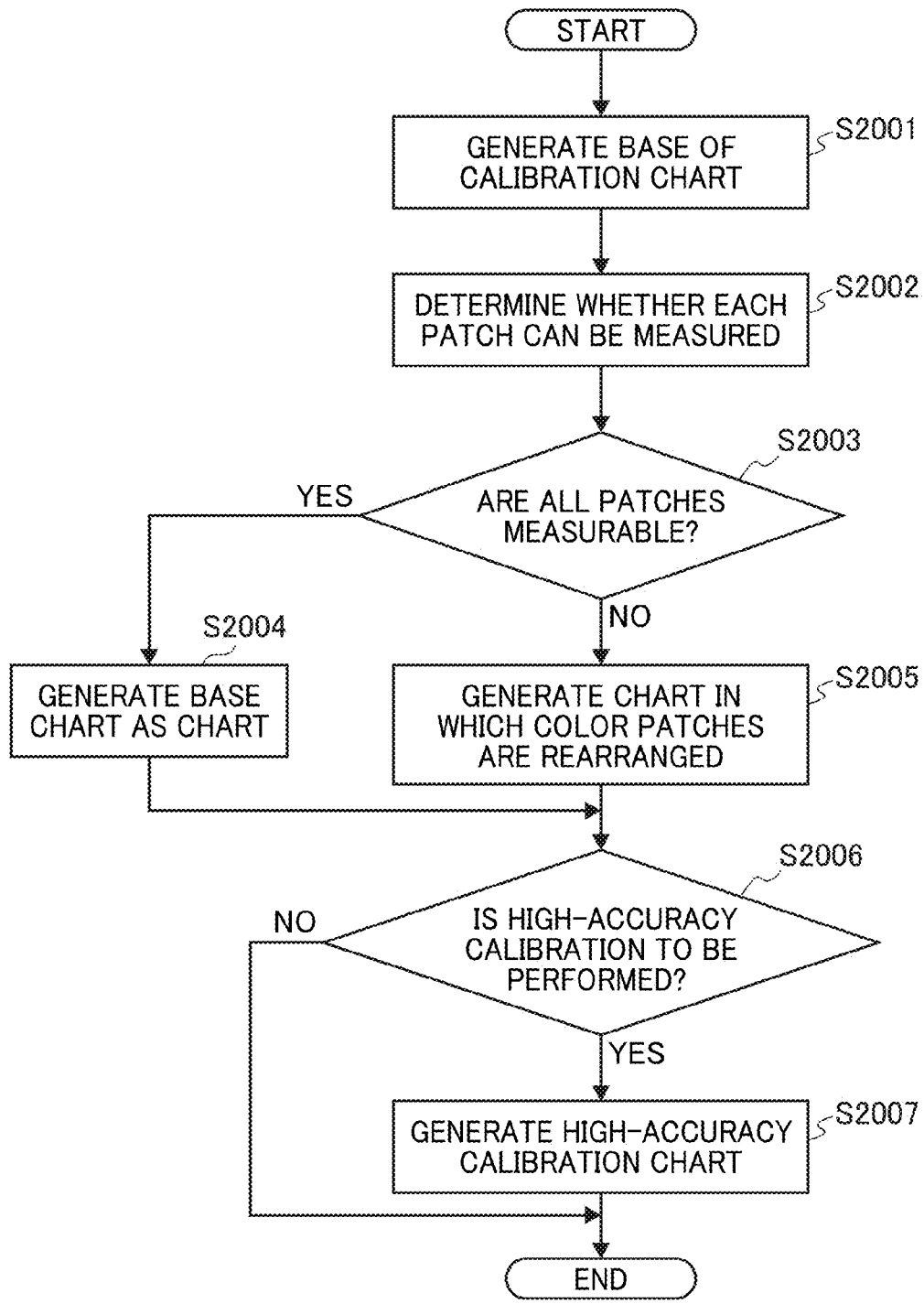
FIG. 5 is a flowchart illustrating a process for generating a calibration chart executed by the image forming apparatus.

Color reproducibility is correctable in this manner based on the process in FIG. 4. Hereinafter described with reference to FIG. 5 is the detailed process for generating a chart. FIG. 5 is a flowchart illustrating the process for generating a calibration chart, i.e., the detailed process in step S1004 executed by the image forming apparatus 120 according to the present embodiment.

Figures 6A, 6B:
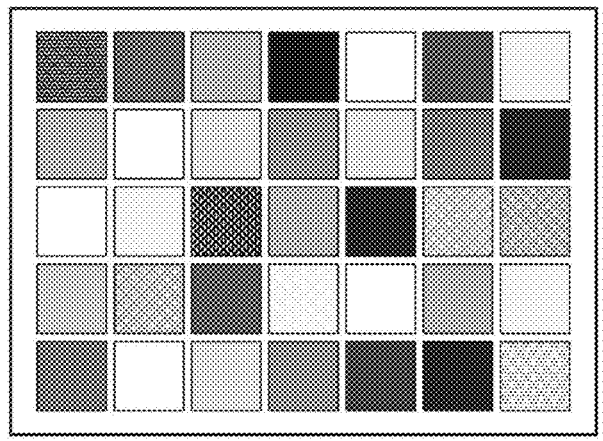
FIGS. 6A and 6B are views illustrating an example of a base calibration chart of the image forming apparatus.

The image forming apparatus 120 having acquired the respective items of data by processing up to step S1003 starts the process for generating a chart illustrated in FIG. 5. In step S2001, the base calibration chart generation unit 351 generates a base chart based on a sheet size, a sheet feeding direction, a color measurable patch size and the like. The base chart generated in this step is touched upon herein with reference to FIGS. 6A and 6B. FIGS. 6A and 6B are views illustrating an example of a base calibration chart in the present embodiment.

Respective color patches contained in the base chart are generated based on patch data values. Color and densities of the color patches are produced by mixing colors. The base chart illustrated in FIG. 6A is an example containing thirty-five color patches constituted by five columns and seven rows. However, the number of color patches contained in the base chart is not limited to this number. In addition, numbers 1 through 35 are assigned to the respective color patches to express the patches as "patch 1, patch 2, and up to patch 35" as illustrated in FIG. 6B.

The description returns to FIG. 5. After the base chart illustrated in FIGS. 6A and 6B is generated in step S2001, it is determined whether colors of the respective patches of the base chart are measurable by the colorimetric sensor 205 in S2002. The determination in step S2002 is made based on the base chart and the sensor data. In step S2003, it is determined whether or not all of the color patches are measurable.

When all of the color patches are measurable (YES), the flow proceeds to step S2004. When color patches not measurable are present (NO), the flow proceeds to step S2005. In step S2005, the color patches not measurable are rearranged at measurable positions, and a chart including the rearranged color patches is generated.

Described with reference to FIGS. 7A-1 through 9B-2 is a method for generating a chart in accordance with determination of measurability of the color patches of the base chart. The figures from FIGS. 7A-1 to 9B-2 illustrate examples of a calibration chart generated in correspondence with the position of the colorimetric sensor 205 in the present embodiment.

Each of FIGS. 7 A-1, 8A-1 and 9A-1 illustrates a base chart read in the sheet direction of LEF, while each of FIGS. 7A-2, 8A-2, and 9A-2 illustrates a chart generated in the sheet direction of LEF. On the other hand, each of FIGS. 7B-1, 8B-1 and 9B-1 illustrates a base chart read in the sheet direction of SEF, while each of FIGS. 7B-2, 8B-2, and 9B-2 illustrates a chart generated in the sheet direction of SEF. A region in a dark color in each of the figures indicates a measurable region by the colorimetric sensor 205.

Examples illustrated in FIGS. 7A-1 through 7B-2 are initially described. According to the examples illustrated in FIGS. 7A-1 through 7B-2, a width W1 of the colorimetric sensor 205 is equivalent to a length of the long side of the sheet, while a center position P1 of the colorimetric sensor 205 is located at the center of the width of the sheet in the main scanning direction. All of color patches are contained in the color measurable region in the examples illustrated in FIGS. 7A-1 and 7B-1. Accordingly, the chart generated by processing in step S2004 may be identical to the base chart as illustrated in FIGS. 7A-2 and 7B-2.

Figures 1, 8A:
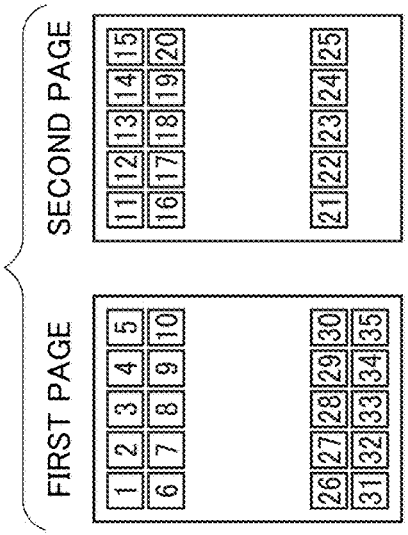
Figures 2, 8A:
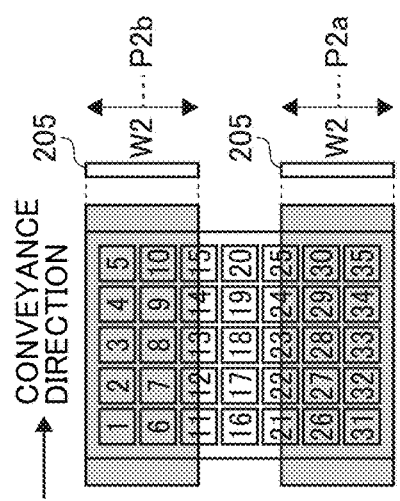

Examples illustrated in FIGS. 8A-1 through 8B-2 are subsequently described. According to the examples illustrated in FIGS. 8A-1 through 8B-2, there are provided the two colorimetric sensors 205 each of which has a width of W2. The two colorimetric sensors 205 are located at center positions P2a and P2b, respectively. In case of the example illustrated in FIG. 8A-1, patches 1 through 10 and patches 26 through 35 are contained in the color measurable regions, while patches 11 through 25 are not contained in the color measurable regions. Accordingly, generated in the processing in step S2005 is a chart in which the patches 11 through 25 are arranged in the color measurable region in a second page as illustrated in FIG. 8A-2.

Figures 2, 8B:
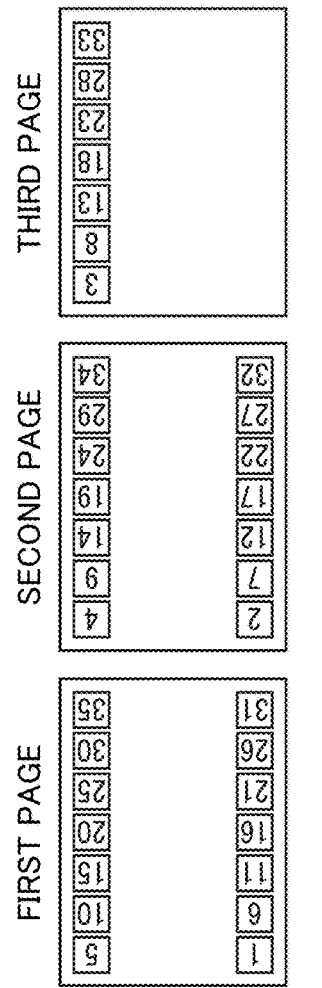
Figures 1, 8B:
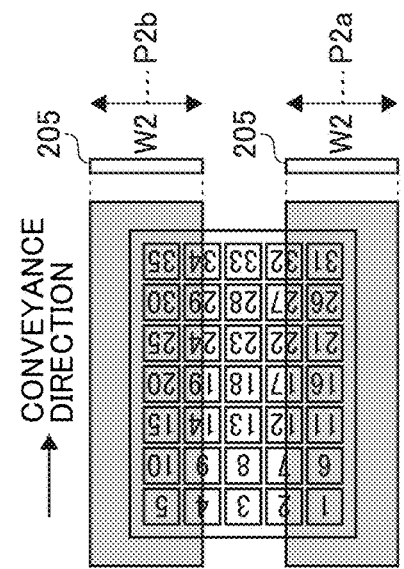

The example illustrated in FIG. 8B-1 is similarly processed. More specifically, color patches in the first column in the main scanning direction (patches 1, 6, 11, 16, 21, 26, 31) and color patches in the fifth column in the main scanning direction (patches 5, 10, 15, 20, 25, 30, 35) are contained in the color measurable regions, while color patches in the second through fourth columns (patches 2 through 4, 7 through 9, 12 through 14, 17 through 19, 22 through 24, 27 through 29, 32 through 34) are not contained in the color measurable regions. Accordingly, generated in the processing in step S2005 is a chart in which the color patches of the second through fourth columns are arranged in the color measurable regions in second and third pages as illustrated in FIG. 8B-2.

Figure 9A:
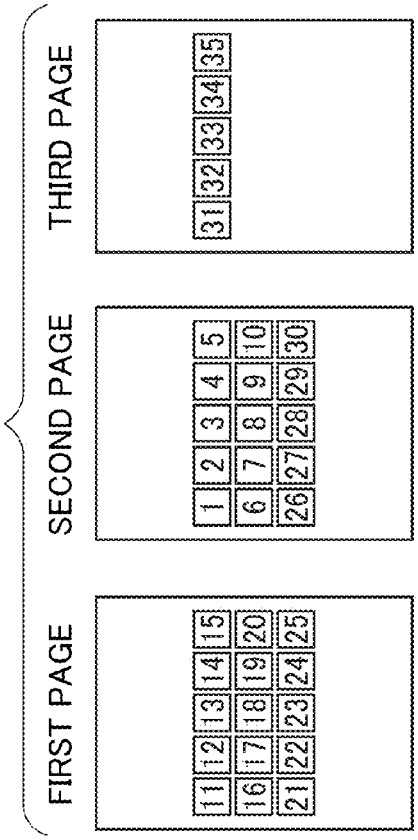
Figure 1:
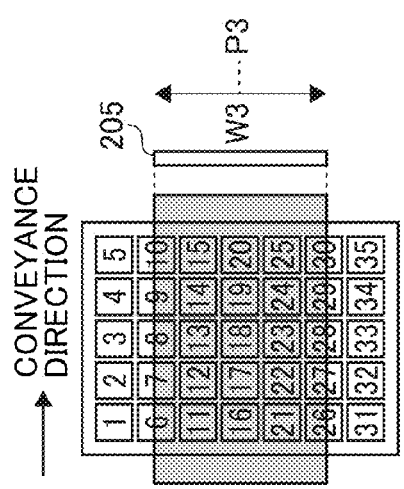
Figure 2:
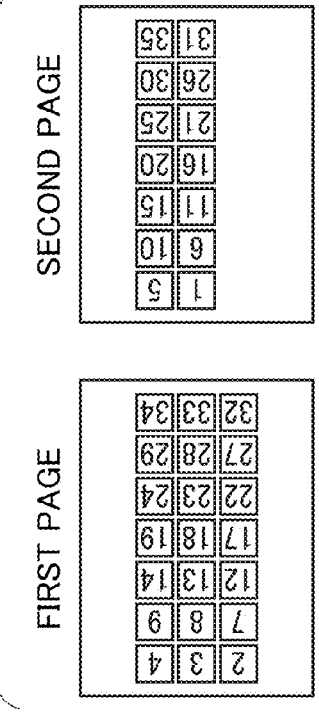
FIG. 2 is a diagram illustrating a hardware configuration of an image forming apparatus according to an embodiment of the present disclosure.

Examples illustrated in FIGS. 9A-1 through 9B-2 are finally described. According to the examples illustrated in FIGS. 9A-1 through 9B-2, the colorimetric sensor 205 has a width W3. A center position P3 of the colorimetric sensor 205 is located at the center of the width of the sheet in the main scanning direction. In case of the example illustrated in FIG. 9A-1, patches 11 through 25 are contained in the color measurable region, while patches 1 through 10 and patches 26 through 35 are not contained in the color measurable region. Accordingly, generated in the processing in step S2005 is a chart in which the patches 1 through 10 and patches 26 through 35 are arranged in the color measurable region in second and third pages as illustrated in FIG. 9A-2.

Figure 9B:
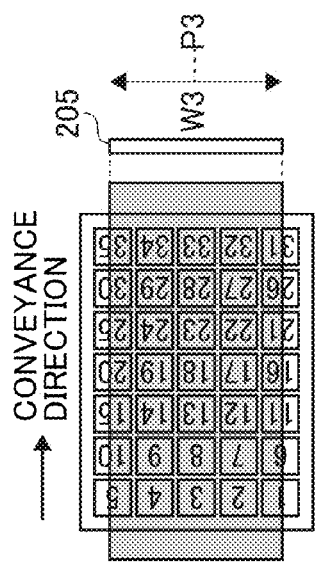

The example illustrated in FIG. 9B-1 is similarly processed. More specifically, color patches in the second column through fourth column in the main scanning direction (patches 2 through 4, 7 through 9, 12 through 14, 17 through 19, 22 through 24, 27 through 29, 32 through 34) are contained in the color measurable region, while color patches in the first column (1, 6, 11, 16, 21, 26, 31) and color patches in the fifth column in the main scanning direction (patches 5, 10, 15, 20, 25, 30, 35) are not contained in the color measurable region. Accordingly, generated in the processing in step S2005 is a chart in which the color patches of the first column and the fifth column are arranged in the color measurable region in a second page as illustrated in FIG. 9B-2.

A chart is generated in correspondence with the position of the colorimetric sensor 205 as described above. The number of charts to be output is smaller in the sheet direction of LEF in the examples illustrated in FIGS. 8A-1 through 8B-2. On the other hand, the number of charts to be output is smaller in the sheet direction of SEF in the examples illustrated in FIGS. 9A-1 through 9B-2.

Description returns to FIG. 5. After generation of the chart by processing in step S2004 or S2005, the flow proceeds to step S2006 to determine the necessity of high-accuracy calibration for correcting cyclic density fluctuations. The determination in step S2006 is made based on whether or not acquired color fluctuation data contains density cyclic fluctuations in the sub-scanning direction. Alternatively, the determination in step S2006 may be made based on comparison between the density fluctuation cycle and the length of the sheet in the sub-scanning direction.

When it is determined that the high-accuracy calibration is unnecessary in step S2006 (NO) based on absence of density cyclic fluctuations in the sub-scanning direction in the color fluctuation data, the process ends.

When it is determined that the high-accuracy calibration is necessary in step S2006 (YES) based on presence of density cyclic fluctuations in the sub-scanning direction in the color fluctuation data, the flow proceeds to step S2007. In step S2007, a high-accuracy calibration chart (hereinafter referred to as high-accuracy chart) is generated. Then, the process ends. Cyclic density fluctuations are hereinafter detailed.

Cyclic density fluctuations may be produced in the sub-scanning direction of a printed material as a result of eccentricity of a photoconductor drum included in the image forming apparatus 120. For example, density fluctuations of approximately 90 mm are produced in a device which includes a photoconductor drum having a diameter of 30 mm. In this case, produced are fluctuations of about three cycles in A4 portrait orientation, and fluctuations about one cycle in A4 landscape orientation. On the other hand, density fluctuations of approximately 300 mm are produced in a device which includes a photoconductor drum having a diameter of 100 mm. In this case, produced are fluctuations of about one cycle in A4 portrait orientation, and fluctuations about 0.5 cycle in A4 landscape orientation. It is therefore preferable that these density fluctuations, which may cause measurement errors in colorimetry of a chart, are removed.

For example, effects of density fluctuations on calibration are reduced by such a method which arranges identical color patches at positions shifted by a half of a fluctuation cycle in the sub-scanning direction of a chart (sheet conveyance direction), and calculates an average of colorimetric values of the two color patches. A method for generating a high-accuracy chart is hereinafter described with reference to FIGS. 10A and 10B. FIGS. 10A and 10B illustrate an example of a calibration chart generated when color fluctuations are produced in the present embodiment.

FIG. 10A is a chart generated in step S2004, and identical to the chart illustrated in FIG. 9A-2. Described herein is an example which generates a high-accuracy chart when a density fluctuation cycle T is present in this chart.

In this case, color patches contained in a range from a start position to a half cycle (T/2) of a photoconductor in the sub-scanning direction are copied, and arranged with a shift of T/2. For example, the patches 11 through 13, 16 through 18, and 21 through 23 are contained in the range up to T/2 in the example illustrated in FIG. 10A. These color patches are copied and rearranged at positions shifted by T/2. In this case, the copied patches 13, 18 and 23 are arranged out of the page size in the sheet conveyance direction. Accordingly, these copied patches are rearranged not in the first page but in the second or later pages.

A high-accuracy chart illustrated in FIG. 10B is generated by repeating this process. According to calibration based on the high-accuracy chart, correction reflecting density fluctuations is achievable by using an average of colorimetric values of color patches to which an identical number has been assigned, i.e., a value near a center value of cyclic fluctuations.

Figure 11:
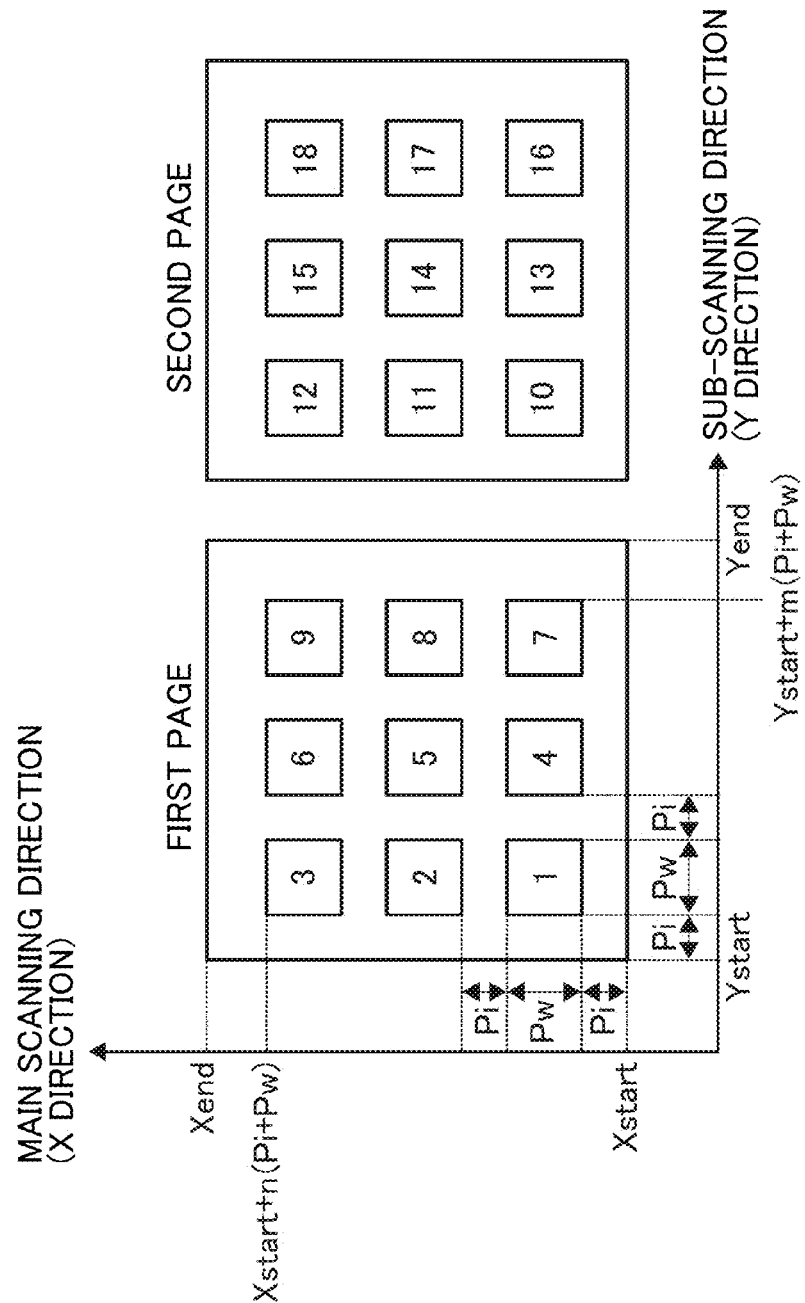
FIG. 11 is a view illustrating an example for generating a base calibration chart for a sheet in an irregular size in the image forming apparatus.
Figure 12:
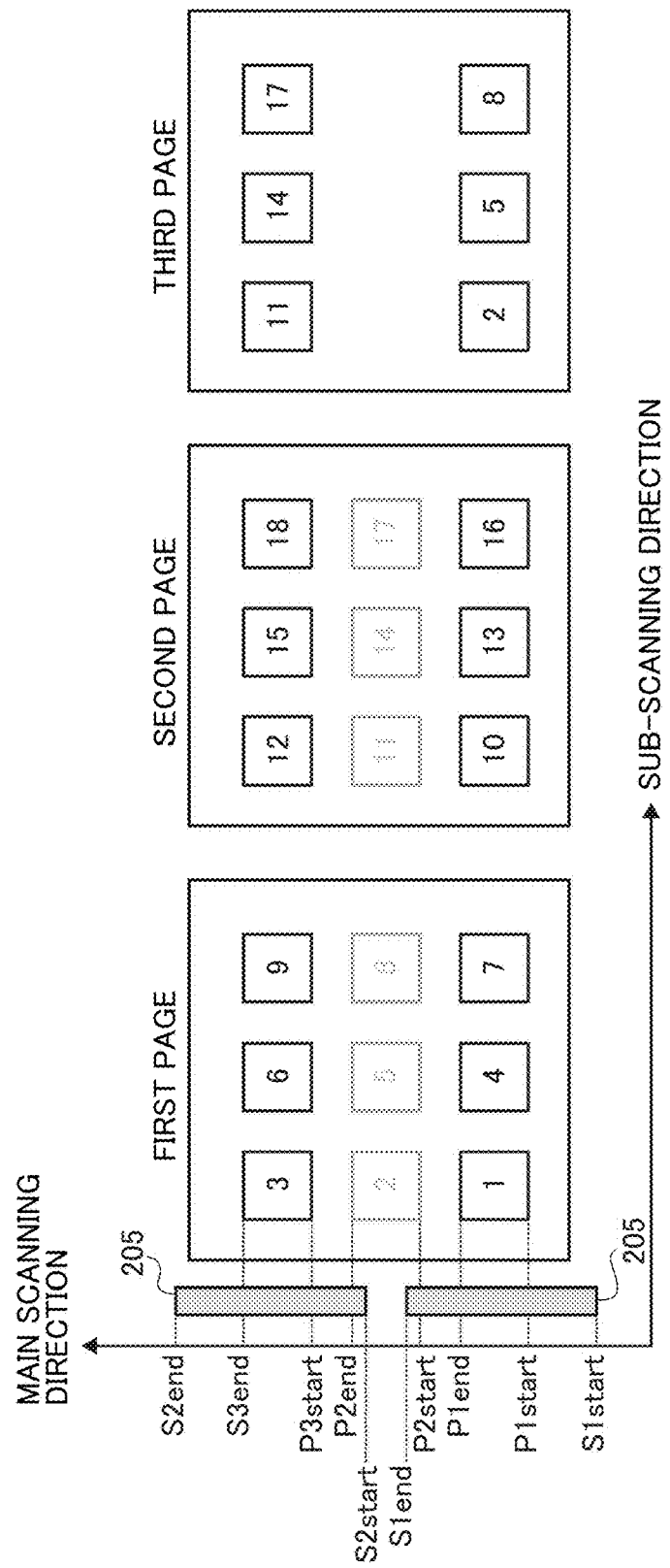
FIG. 12 is a view illustrating an example for generating a calibration chart for a sheet in an irregular size in the image forming apparatus.

A chart is generated in the manner described in the foregoing examples with reference to FIGS. 5 through 10B. Hereinafter described with reference to FIGS. 11 and 12 is an example for generating a chart for a sheet in an irregular size. FIG. 11 is a view illustrating an example for generating a base calibration chart for a sheet in an irregular size in the present embodiment.

According to the example illustrated in FIG. 11, it is assumed that a sheet start position (Xstart) and a sheet end position (Xend) in the main scanning direction, and a sheet start position (Ystart) and a sheet end position (Yend) in the sub-scanning direction have been acquired as sheet data. In the following description, "start" and "end" are abbreviated as "s" and "e", respectively. In addition, it is assumed that a measurable patch size (Pw) and a patch interval (Pi) have been acquired as sensor data. While the number of color patches is eighteen in the example illustrated in FIG. 11, the number of color patches is not limited to this number.

Initially, a patch 1 starting from coordinates (Xs+Pi, Ys+Pi) is formed in a size of Pw in each of the main scanning direction and the sub-scanning direction. Subsequently, a patch 2 starts from a position shifted by Pi in the main scanning direction (Xs+2Pi+Pw) from an end position of the patch 1 (Xs+Pi+Pw) in the main scanning direction. Accordingly, the patch 2 starting from coordinates (Xs+2Pi+Pw, Ys+Pi) is formed in a size of Pw in each of the main scanning direction and the sub-scanning direction.

A color patch 3 and subsequent color patches are formed in a similar manner. However, when an end position of a (n+1)th color patch (Xs+(n+1)(Pi+Pw)) in the main scanning direction exceeds Xe, this patch is formed at a position shifted by Pi in the sub-scanning direction from the color patch of the smallest number in the identical row. More specifically, according to the example illustrated in FIG. 11 where three color patches are arranged in each row, a patch 4 starting from coordinates (Xs+Pi, Ys+2Pi+Pw) is formed in a size Pw in each of the main scanning direction and the sub-scanning direction.

Color patches for the second and later rows are arranged by repeating this process. When an end position of a (m+1)th row color patch in the sub-scanning direction exceeds Ye similarly to the main scanning direction, this patch is formed at a position shifted to the subsequent page. The base chart illustrated in FIG. 11 is generated in this manner. A chart generated based on the base chart illustrated in FIG. 11 is hereinafter described. FIG. 12 is a view illustrating an example for generating a calibration chart for a sheet in an irregular size in the present embodiment.

The chart illustrated in FIG. 12 is generated as a chart corresponding to the chart illustrated in FIG. 11 and reflecting the number of the colorimetric sensors 205 and a reading position. According to the example illustrated in FIG. 12, it is assumed that reading start positions S1$s$ and S2$s$ and reading end positions S1$e$ and S2$e$ are indicated by two sensors, respectively, in the main scanning direction in acquired sensor data.

It is determined whether colors of respective color patches are measurable by the colorimetric sensors 205 based on this data. The determination of measurability is made for each row in the main scanning direction. Assuming that a start position and an end position of a color patch at an nth row in the main scanning direction are Pnstart and Pnend, respectively, the determination is made based on following Mathematical Formula 1.

Mathematical Formula 1

$$S1start < Pnstart \cap Pnend < S1end \quad (1\text{-}1)$$

$$\text{or } S2start < Pnstart \cap Pnend < S2end \quad (1\text{-}2)$$

Measurability of a color patch is determined when the start position and the end position of the color patch in the main scanning direction meets either Formula (1-1) or Formula (1-2).

According to the example illustrated in FIG. 12, color patches on the first row (patches 1, 4, 7) are arranged in a state S1start<P1start and P1end<S1end. Accordingly, the color patches on the first row meet Formula (1-1), and therefore are determined as measurable. On the other hand, color patches on the second row (patches 2, 5, 8) meet none of Formulae (1-1) and (1-2). Accordingly, the color patches on the second row are determined as not measurable. Color patches (patches 3, 6, 9) on the third row are arranged in a state S2start<P3start and P3end<S2end. Accordingly, the color patches on the third row meet Equation (1-2), and therefore are determined as measurable. Measurability in the second page is determined in a similar manner.

According to the determination of color measurability in the foregoing manner, the patches 2, 5, 8, 11, 14, and 17 are not measurable in FIG. 12. Accordingly, a chart which rearranges these color patches in the measurable region is generated on the third and subsequent pages.

A calibration chart is generated even for a sheet in an irregular size in the manner described above. While the positions of the sensors in the sensor data are defined based on the reading start position and the reading end position in the main scanning direction as described above, the positions of the sensors may be determined in accordance with the readable width and the center position of each sensor.

Accordingly, provided according to the embodiments of the present disclosure described above are an image forming apparatus, a method, and a program for generating a calibration chart for automatic calibration regardless of a sheet feeding direction.

The respective functions according to the above-described embodiments of the present disclosure are realizable under a program written in C, C++, C#, Java (registered trademark) or the like and executable by a device. The program according to the present embodiment may be stored and distributed in the form of a recording medium, such as hard disk device, compact disk read-only memory (CD-ROM), magneto-optical disk (MO), digital versatile disk (DVD), flexible disk, electrical erasable programmable read-only memory (EEPROM), and erasable programmable read-only memory (EPROM), or received from other devices in a transmittable form via a network.

The present disclosure is described with reference to the example embodiments, but is not limited to the embodiments specifically described herein, and may be practiced otherwise without departing from the scope of modes occurring to those skilled in the art, as long as operations and effects of the present disclosure are offerable.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus to generate a calibration chart including a plurality of patches at different densities, the image forming apparatus comprising:
   at least one sensor;
   a memory to store patch data values of the plurality of patches; and
   a circuitry to
      acquire sheet data about a sheet to which the calibration chart, once generated, will be output,
      acquire color fluctuation data containing a density fluctuation cycle in a sub-scanning direction, and
      generate the calibration chart, the plurality of patches being arranged in a color measurable region of the at least one sensor, based on at least the sheet data acquired, the color fluctuation data acquired, and data indicating the color measurable region.

2. The image forming apparatus of claim 1, wherein the sheet data includes a start position of the sheet and an end position of the sheet in a main scanning direction of the at least one sensor, and a start position of the sheet and an end position of the sheet in a sub-scanning direction of the at least one sensor.

3. The image forming apparatus of claim 1, wherein the data indicating the color measurable region of the at least one sensor includes a reading start position and a reading end position in a main scanning direction of the at least one sensor, and a reading start position and a reading end position in a sub-scanning direction of the at least one sensor.

4. The image forming apparatus of claim 1, wherein the circuitry is further configured to perform a determination of whether the plurality of patches are arranged in the color measurable region of the at least one sensor, based on the sheet data acquired, and produce a result of the determination, and
wherein the circuitry is further configured to generate the calibration chart, based on the result of the determination.

5. The image forming apparatus of claim 1, wherein the patch data values include RGB values of colorants, or halftone dot area ratios of colorants.

6. The image forming apparatus of claim 1, wherein the circuitry is further configured to position the plurality of patches in an overlapping region, between the color measurable region of the at least one sensor and a printable region calculated based on the sheet data acquired.

7. The image forming apparatus of claim 1, wherein the calibration chart, once generated based on the color fluctuation data, includes identical patches at positions shifted by a half cycle of the density fluctuation cycle in the sub-scanning direction.

8. A method of generating a calibration chart including a plurality of patches at different densities, the method comprising:
acquiring sheet data about a sheet to which the calibration chart, once generated, will be output;
acquiring color fluctuation data containing a density fluctuation cycle in a sub-scanning direction; and
generating the calibration chart, the plurality of patches being arranged in a color measurable region of at least one sensor of a device to output the calibration chart, based on at least the sheet data acquired, the color fluctuation data acquired, and data indicating the color measurable region.

9. The method of claim 8, wherein the sheet data includes a start position of the sheet and an end position of the sheet in a main scanning direction of the at least one sensor, and a start position of the sheet and an end position of the sheet in a sub-scanning direction of the at least one sensor.

10. The method of claim 8, wherein the data indicating the color measurable region of the at least one sensor includes a reading start position and a reading end position in a main scanning direction of the at least one sensor, and a reading start position and a reading end position in a sub-scanning direction of the at least one sensor.

11. The method of claim 8, further comprising:
determining whether the plurality of patches are arranged in the color measurable region of the at least one sensor based on the sheet data acquired and producing a result of the determining, wherein the generating includes generating the calibration chart, based on the result of the determining.

12. The method of claim 8, wherein the patch data values include RGB values of colorants, or halftone dot area ratios of colorants.

13. The method of claim 8, wherein the generating includes arranging the plurality of patches in an overlapping region between the color measurable region of the at least one sensor and a printable region calculated based on the sheet data acquired.

14. The method of claim 8, wherein the calibration chart, once generated based on the color fluctuation data, includes identical patches at positions shifted by a half cycle of the density fluctuation cycle in the sub-scanning direction.

15. A non-transitory recording medium storing a computer executable program to cause an image forming apparatus to perform a method of generating a calibration chart including a plurality of patches at different densities, the method comprising:
storing patch data values of the plurality of patches;
acquiring sheet data about a sheet to which the calibration chart, once generated, will be output;
acquiring color fluctuation data containing a density fluctuation cycle in a sub-scanning direction; and
generating the calibration chart, the plurality of patches being arranged in a color measurable region of at least one sensor of the image forming apparatus, based on at least the sheet data acquired, the color fluctuation data acquired, and data indicating the color measurable region.

16. The non-transitory recording medium of claim 15, wherein the calibration chart, once generated based on the color fluctuation data, includes identical patches at positions shifted by a half cycle of the density fluctuation cycle in the sub-scanning direction.

17. The non-transitory recording medium of claim 15, wherein the method further comprises:
determining whether the plurality of patches are arranged in the color measurable region of the at least one sensor based on the sheet data acquired and producing a result of the determining, wherein the generating includes generating the calibration chart, based on the result of the determining.

18. The non-transitory recording medium of claim 15, wherein the patch data values include RGB values of colorants, or halftone dot area ratios of colorants.

19. The non-transitory recording medium of claim 15, wherein the generating includes arranging the plurality of patches in an overlapping region between the color measurable region of the at least one sensor and a printable region calculated based on the sheet data acquired.

* * * * *